US005485190A

United States Patent [19]

Koetter et al.

[11] Patent Number: 5,485,190

[45] Date of Patent: Jan. 16, 1996

[54] PRINTHEAD WRITER ASSEMBLY ENGAGEABLE WITH A WEB IMAGE MEMBER

[75] Inventors: Frank J. Koetter, Hilton; W. Charles Kasiske, Rochester, both of N.Y.

[73] Assignee: Eastman Kodak Company, Rochester, N.Y.

[21] Appl. No.: 65,248

[22] Filed: May 20, 1993

[51] Int. Cl.[6] .............................. G01D 15/14; G01D 9/42

[52] U.S. Cl. .......................... 347/130; 347/138; 347/139; 347/149; 347/154; 347/238; 347/245; 347/257

[58] Field of Search .................................... 346/160, 155, 346/107 R, 108; 250/494.1; 347/138, 139, 149, 152, 154, 130, 238, 245, 257

[56] References Cited

U.S. PATENT DOCUMENTS

| | | | |
|---|---|---|---|
| 4,278,982 | 7/1981 | Cholet et al. . | |
| 4,427,284 | 1/1984 | Cannatt . | |
| 4,703,334 | 10/1987 | Mochimaru et al. | 346/160 |
| 4,715,682 | 12/1987 | Koek et al. | 355/1 X |
| 4,728,981 | 3/1988 | Koek et al. | 355/1 |
| 4,768,096 | 8/1988 | Cannella et al. | 358/294 |
| 4,780,730 | 10/1988 | Dodge et al. | 346/108 |
| 4,806,991 | 2/1989 | Guslits | 355/3 DD |
| 4,821,051 | 4/1989 | Hediger | 346/155 |
| 4,896,168 | 1/1990 | Newman et al. | 346/107 R |
| 4,913,526 | 4/1990 | Hediger | 355/1 X |
| 4,926,198 | 5/1990 | Barton et al. | 346/155 |
| 4,928,119 | 5/1990 | Walker et al. | 346/108 |
| 4,928,139 | 5/1990 | Barton et al. | 355/1 |
| 5,001,028 | 3/1991 | Mosehauer et al. | 430/45 |
| 5,036,339 | 7/1991 | Hediger | 346/107 R |
| 5,089,846 | 2/1992 | Tabuchi | 346/155 |
| 5,237,348 | 8/1993 | Blanding et al. | 346/160 |
| 5,249,943 | 3/1994 | Blanding et al. | 346/108 |
| 5,339,132 | 8/1994 | Tomita et al. | 355/200 |

*Primary Examiner*—Peter S. Wong
*Assistant Examiner*—Randy W. Gibson
*Attorney, Agent, or Firm*—Leonard W. Treash, Jr.

[57] ABSTRACT

A linear printhead writer assembly includes a linear source of radiation such as an LED printhead, and an elongated linear focusing device such as a linear lens array, and a support housing for supporting both the source of radiation and focusing device in a fixed relation with respect to each other and to an exposure locus. A positioning bar is supported by the support housing and engages a web image member to position the image member with respect to the exposure locus. The writer is preferably used with an image member having a radiation-sensitive layer on a side opposite the writer and is particularly adapted for exposing a charged image member already containing a toner image as part of a process to create a two-color image on the image member. The focusing device is held in the writer assembly by a coupling with a pair of end supports, each coupling allowing thermal expansion of the lens support and also isolating the lens support from vibration transmitted through the support housing.

16 Claims, 5 Drawing Sheets

PRINTHEAD WRITER ASSEMBLY ENGAGEABLE WITH A WEB IMAGE MEMBER

CROSS REFERENCE TO RELATED APPLICATIONS

This application is related to cofiled U.S. patent application Ser. No. 08/064,621, METHOD AND APPARATUS FOR FORMING TWO TONER IMAGES IN A SINGLE FRAME, Eric C. Stelter et al; U.S. patent application Ser. No. 08/065,249, May 20, 1993 IMAGE FORMING METHOD AND APPARATUS, Joseph Kaukeinen et al, filed May 20, 1994; U.S. patent application Ser. No 08/065,246, METHOD OF FORMING TWO TONER IMAGES IN A SINGLE FRAME, Joseph E. Guth et al, filed May 20, 1994; U.S. patent application Ser. No. 08/064,626, METHOD AND APPARATUS FOR DEVELOPING AN ELECTROSTATIC IMAGE USING A TWO COMPONENT DEVELOPER, Eric C. Stelter et al, filed May 20, 1993; and U.S. patent application Ser. No. 08/064,625, METHOD AND APPARATUS FOR FORMING A COMPOSITE DRY TONER IMAGE, Joseph Kaukeinen et al, filed, May 20, 1993.

BACKGROUND OF THE INVENTION

This invention relates to a printhead writer assembly. Although not limited thereto, it is particularly usable in mounting a linear LED array and its lens with respect to an image member.

U.S. Pat. No. 4,715,682 and U.S. Pat. No. 4,728,981, issued Dec. 29, 1987 and Mar. 1, 1988, respectively, to K. C. Koek et al, shows an LED printhead assembly. The assembly includes an elongated focusing device, such as a linear gradient index lens array, and an elongated linear source of radiation. The radiation source includes a conventional linear array of LED's on a suitable support with a transparent faceplate and a cooling mechanism. The lens array (sometimes called the "lens") is fixed to a lens support which, in turn, is mounted in a housing. One end of the lens support is fixed to the housing and the other is allowed to move against a spring to allow for thermal expansion. The housing includes a mechanism for mounting the LED printhead and the lens with respect to each other and also with respect to a web type image member.

U.S. Pat. No. 4,928,139, issued May 22, 1990 to Barton et al shows an LED printhead assembly in which a bracket receives the linear LED array and a support for the lens. The factory positioning of the lens with respect to the LED array is accomplished by oversized holes in the bracket and screws which fit into the lens support through the oversized holes. Movement within the holes allows movement of the lens during accurate positioning. Oversized washers on the screws are adhesively fixed to the portion of the bracket surrounding the holes once the desired position between the LED array and the lens is achieved. Thermal expansion between the lens support and the bracket is handled by sliding movement between the screws and the adhesively fixed washers.

U.S. Pat. No. 5,036,339, granted to Hediger Jul. 30, 1991, shows thermal expansion compensation structure in which a lens support is mounted to float in two directions while maintaining its distance from the LED array.

U.S. Pat. No. 4,821,051, Hediger issued Apr. 11, 1989, and U.S. Pat. No. 4,913,526, Hediger issued Apr. 3, 1990, show a thermal expansion compensation structure in which the lens support is fixed in the middle and allowed to expand in both directions. See also U.S. Pat. No. 4,896,168, Newman et al issued Jan. 23, 1990.

U.S. Pat. Nos. 4,926,198, issued May 15, 1990 and U.S. Pat. No. 4,928,119, issued May 22, 1990, both to Barton and Walker, show an LED printhead assembly having four bearing surfaces. The bearing surfaces are urged against a pair of cylindrical surfaces coaxial with a roller which backs a web type image member. See also, U.S. Pat. No. 4,703,334, issued Oct. 27, 1987 to Mochimaru et al.; U.S. Patent No. 4,278,982, granted July 1981 to Cholet, U.S. Pat. No. 4,780,730, granted October 1988 to Dodge, and U.S. Pat. No. 4,427,284, issued January 1984 to Dannatt.

Most of the above assemblies work with a web image member, for example, a photoconductive image member. Positioning of the lens and LED array with respect to the web image member is accomplished by contact with a backing roller or other web support directly or through intermediate machine structure. Basically, the positioning structure goes around the image member to whatever is backing the web.

U.S. Pat. No. 4,806,991, issued Feb. 21, 1989 to Guslits, is representative of a number of structures showing mounting of development and other stations with respect to an image member. In this reference a backing roller is moved into a web to push it toward a properly spaced position with respect to an image member.

SUMMARY OF THE INVENTION

It is an object of the invention to provide a linear printhead writer assembly which is simply and reliably positioned with respect to an image member, especially a web type image member.

This and other objects are accomplished by a linear printhead writer assembly particularly usable with a web type image member having at least one radiation-sensitive layer. The writer assembly includes an elongated linear source of radiation and a linear focusing device. A support housing supports both the linear source and the focusing device in a fixed relation with respect to each other and with respect to an exposure locus with both the linear source, the focusing means and the exposure locus being elongated in a Z direction. A positioning bar is supported by the support housing and is also elongated in the Z direction and is accurately positioned with respect to the exposure locus to engage the image member and position the image member with the radiation-sensitive layer in the exposure locus.

According to a preferred embodiment, the positioning bar is eccentrically mounted to the support housing. Rotation of the positioning bar adjusts the position of the bar and, thus, the position of the image member with respect to the exposure locus.

Although the writer assembly is usable in an image forming apparatus in which the support bar contacts the front side of the image member, it has greater utility when used in an orientation in which the positioning bar contacts the rear of a web type image member having its radiation-sensitive layer opposite the writer assembly.

Advantages of the preferred embodiment includes it simplicity, reliability and general robustness compared to systems which have connecting pieces from the writer assembly around the image member to image member support structure. A particularly advantageous aspect of the preferred embodiment is that no spring or other resilient means is needed to urge the writer assembly into the image member or against a backing roller. The writer assembly can be mounted in a fixed position in the apparatus and the web type image member tensioned over the positioning bar where it is automatically in the exposure locus of the focusing means of the writer assembly.

According to a further preferred embodiment, the writer assembly can have two positioning bars on opposite sides of the focusing means, each of which engage the image member and each of which are located to assure proper positioning of the radiation-sensitive layer of the image member in the exposure locus. In this preferred embodiment, either or both of the positioning bars can be adjustable to accurately locate the exposure locus of the writer assembly.

It is another object of the invention to provide an advantageous approach to allowing for thermal expansion of a support for the focusing device as it becomes heated by the operation of a radiation source. According to a preferred embodiment, thermal expansion is compensated by holding the focusing device support through couplings at both ends of the focusing device support, allowing expansion against a spring or other dampening means. With this structure the focusing device is isolated from the housing and, not only is thermal expansion absorbed, but any vibration to the apparatus is also absorbed or dampened. This aspect is significant since vibration of a writer assembly can show up as a substantial visible defect in a final image.

DESCRIPTION OF THE PREFERRED EMBODIMENTS

FIGS. 2*a*–2*f* show a method of forming two dry and unfixed toner images on the same area or frame of an image member 1. Although the toners do not have to be of different color, a multicolor application is the most attractive use of this process, and the description will be in terms of color. Further, for illustration, a two color image will be described, but the same process can be used to form three or more images which can be of different color.

Figure 2A:
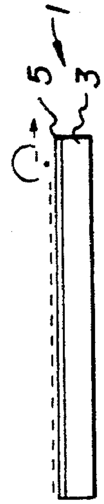
FIGS. 2*a*–2*f* are side schematic sections illustrating the steps of an image forming method.

According to FIG. 2*a*, an image member 1 includes a support 3 and a photoconductive layer 5. It is a typical image member used in electrophotography. If the support 3 is not conductive, it will contain a conductive layer between the support and the photoconductive layer 5. It can be much more complex than illustrated, including charge generation layers, charge transport layers, barrier layers and protective overcoat layers. For purposes herein, however, it is conveniently illustrated as a support with a photoconductive layer.

Figure 2B:
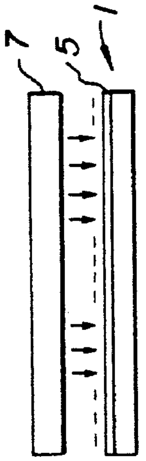

According to FIG. 2*a*, the photoconductive layer 5 is uniformly charged with a charge of a first potential, for example, a negative potential. As shown in FIG. 2*b*, an electrostatic image is created on image member 1 by imagewise exposing the charged photoconductive layer 5, for example, by exposing it with an LED printhead writer 7.

Figure 2C:
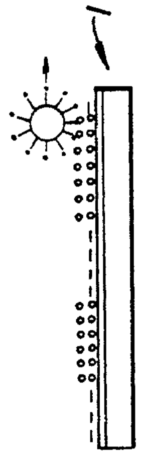

According to FIG. 2*c*, the electrostatic image is toned by the application of dry toner having a charge of the first polarity, in this instance, a negative charge, to create a first toner image. This toner is preferably of a first color, for example, black.

Figure 2D:
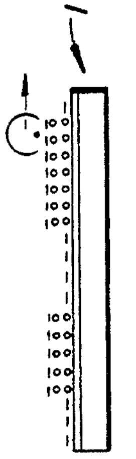

As shown in FIG. 2*d*, the image member 1 is then charged again with a charge of the first polarity, that is, a negative charge. According to FIG. 2*e*, a second electrostatic image is formed on the image member by imagewise exposing the image member 1, for example, with another or the same LED printhead writer 7. According to FIG. 2*f*, the second electrostatic image is toned by the application of a second toner of the first polarity. The second toner adheres to the image member in the exposed portions of the second electrostatic image to create a second toner image, which can be of a second color, for example, red. The image member 1 now has black toner in the exposed portions of the first image and red toner in the exposed portions of the second image and no toner where there has been no exposure thus far. Additional images can be placed in the areas that have not yet been exposed using toners of different colors to create three or more color images. Although the process can be used with ordinary optical copiers, it is preferably used with electronic printers and copiers.

The step illustrated in FIG. 2*d* in which the image member is recharged before the second exposure can, in theory, be eliminated. That is, the image member in its condition shown in FIG. 2*c*, contains charge in the unexposed areas which could be used to form the second electrostatic image. However, it is found that less overtoning results if the image member is recharged to assure that both the toned areas and the untoned areas are placed at approximately an even charge so that the next toner image will accumulate only in the exposed areas of the second electrostatic image. The second charging step can also be used to compensate for variations in the materials in the two toning steps.

Figure 3:
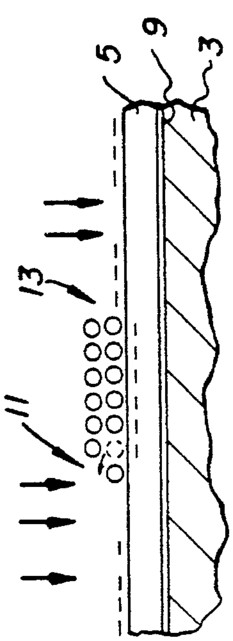
FIGS. 3–7 are side schematic sections illustrating various aspects of an image forming methods.
Figure 2E:
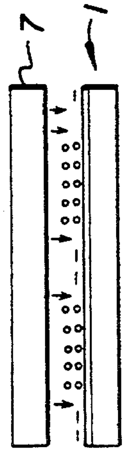

FIG. 3 illustrates a problem we encountered with the exposure creating the second electrostatic image, which exposure is also shown in FIG. 2*e*. As shown in FIG. 3, toner at an edge 11 of the first toned image has a tendency to move into exposed areas of the second electrostatic image that adjoin it. That is, toner along the edge 11 of the first toner image has a tendency to move to the left, as shown in FIG. 3, when the second electrostatic image includes exposed areas directly adjoining it. Note that toner along the right edge 13 of the first toner image does not move because there is no exposed portion of the second electrostatic image adjoining it.

This problem has been solved in the prior art by programming the second exposure to not adjoin the first toner image. However, this requires precise registration of the images and leaves an untoned line between the two toner images which is not acceptable in high quality imaging. In experimenting with and in analyzing the problem, we found that the uniform charging step illustrated in FIG. 2*d*, while evening up the charge on the combination of the image member and the first toner image, also causes charge of the first polarity to move through the first toner image to the image member. This charge is of o the same polarity as the charge originally placed on the toner and, therefore, causes the toner image to become more loose. The unfixed, dry first toner image is repelled by this charge on the image member. As long as the charge next to the toner image is of the first polarity, there is no place for the toner to go. However, when the second image is exposed, as in FIG. 3, exposures immediately adjacent the toner image, for example, at image edge 11, remove the charge that is holding the first toner image in place. At this point, some toner at the edge of the first toner image is repelled by the charge on the image member underneath it into the adjacent, just exposed areas. This spreads the first toner image and inhibits proper toning of a portion of the second electrostatic image.

Figure 4:
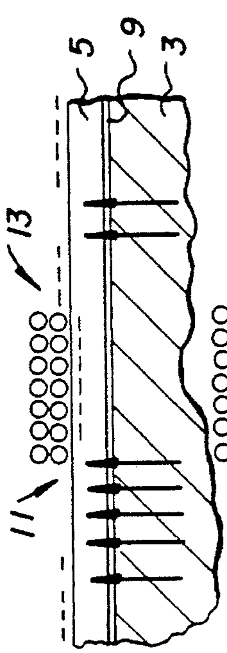

A first solution to this problem is illustrated in FIG. 4. According to FIG. 4, the second exposure, comparable to that shown in FIG. 2e, is preferably made through the support 3. This exposure is allowed to overlap under the first image, as shown in FIG. 4, dissipating the charge under the portion of the image which has a tendency to lose toner. At this point, the toner in the first image is not repelled by the charge underneath it, which no longer exists, and has no mason to move into the adjacent exposed area, as shown at edge 11 in FIG. 4. When the second toner image is applied, as in FIG. 2f, the toner then adheres to the discharged areas with good image density up to the original edge of the first toner image. Depending on the intensity of the exposure overlap, the exposure may cause some overtoning. For this mason, the darker image should be exposed to conform to the desired final image and the lighter image expanded where it is intended to border the darker image.

The amount of exposure overlap that is desirable is dependent upon the materials used and is empirically determinable by those skilled in the art. It is preferable that the amount of overlap be designed into the exposure for the lighter image. Either the first or second image may be the lighter image. Initially, however, a dark first image and a light second image will be discussed. The overlap is accomplished with an appropriate algorithm, as explained below, combining the first and second images and expanding the exposure to adjacent pixels of the lighter image, where those pixels are adjacent pixels of the darker image. The overlap can extend for as little as a single pixel and have an advantageous effect on the tendency of the toner to move into the second electrostatic image. Note that this approach has an additional advantage of preventing a white line between images when exposure registration is less than perfect. If different printheads are used for the exposures (see FIG. 1), the system provides productivity not possible with transfer station registration. However, multiple printheads increase exposure registration problems. Such registration problems can produce a white line between adjacent images. This approach fills in any such white line.

Figure 5:
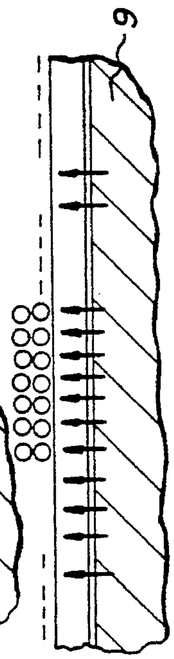
Figure 2F:
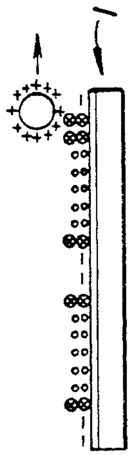

FIG. 5 shows an extended version of FIG. 4 in which electronic signals making up the first and second electrostatic images are fully combined for the second exposure to expose the entire area underneath the first toner image. This approach is appropriate for a first image that is always darker than the second image and, it is the easiest electronically. It has the advantage of assuring that there is no tendency of any of the first toner image to migrate into the exposed portions of the second electrostatic image. It also eliminates the charge on the photoconductor that has a tendency to repel the first toner image, thereby reducing the tendency of the first toner image to be scavenged by the second toning step (FIG. 2f). However, overtoning becomes more noticeable with this approach and may limit the colors with which it is usable. With some materials, to reduce overtoning it is desirable in the FIG. 5 approach to expose underneath a portion or all of the first toner image but not with the same intensity as the exposure in the areas intended to receive the second toner image. Again, the amount of exposure and the extent of the exposure must be determined empirically by the person skilled in the art for the materials being used. What is important in this approach is that at least some of the charge repelling the toner in the first toner image adjacent the exposed areas of the second electrostatic image be dissipated.

In the approach shown in FIG. 4 where the overlap is limited to the portions of the first toner image adjoining exposed areas in the second electrostatic image, a relatively simple algorithm can be used. In a digital accent color copier or printer the image is scanned or stored in the form of an imagewise bit map. Adjacent colors can be detected by comparing adjacent pixels in the incoming data from the scanner or the previously stored bitmap. If, for instance, a first pixel is to be light in the second color and a second pixel is to be dark in the first color, then the second pixel is also exposed in the second exposure (in addition to being exposed in the first exposure). This "grows" the second color into the adjacent first color. The algorithm then compares the second pixel to the third pixel and extends the overlap, as required. Note that if an overlap of one pixel is required and the second pixels already overlap, nothing more would be done at the overlap, no matter what is found in the third pixel, and the algorithm could skip to comparing the third pixel with the fourth pixel. After adjacent images in a line of image are overlapped, the line can be compared pixel-by-pixel to adjacent pixels in the previous line of image. In the simple case of creating an overlap of one pixel, if a pixel in either line is already overlapped, the next pair is compared. If adjacent images are found, the separation for the lighter image is grown so that both the images will be exposed in the second exposure.

In the example shown in FIG. 5, the algorithm is much simpler. As noted above, the second image is added to the first image, with or without the second image being reduced in intensity where it overlies the first image.

Note that exposure under the first image has a tendency to improve the holding power of the first image and thereby reduces the scavenging effect. At the same time, it has a tendency to reduce the overall charge associated with the first image when the second image is toned, thus, it may have a tendency to increase overtoning. The amount of this overtoning is dependent upon the amount of charge that remains across the toner itself in the first image. Experiments have shown that, for most toners, even substantially insulative toners, this is likely to be only between 200 and 250 volts. Thus, using this system, several options are available. The second image can be toned using a toning bias set to prevent toning of areas with an excess of 200 volts potential. Secondly, the intensity of the overlapping exposure can be reduced so that the photoconductor retains a greater portion of the residual charge.

Thirdly, the first image can be allowed to be overtoned and the system used with the lighter image the expanded, overtoning one. This latter approach is preferred. Adjacency of images is most commonly desired where one of the colors is substantially lighter than the other. For example, a black image next to a dark blue or a dark red image is much more rare in practice than is a black image or a dark red or a dark blue image next to a light yellow, light blue, light orange or light pink image.

Thus, according to a preferred embodiment of the invention, if the dark image is laid down first, its exposure is made to conform accurately to its desired appearance in the final image, that is, unexpanded. The reverse can also be done. That is, the expanded light color can be laid down first with the dark color second. In either case, the second exposure is under a portion of the first toner image.

In a more sophisticated image-forming apparatus, gray scale exposure may be used. In such a system, a black toner can be used to produce a range of image density from dark black to light gray. With the black station placed first, nearly all images would be processed so that the black image is produced unexpanded and all other colors adjacent it are expanded into it. However, it is within the skill of the art to recognize the unusual occurrence of a low density black (light gray) pixel next to a much higher density pixel of a color of intermediate darkness like red. In this instance, the black image would be expanded and the red image not expanded. A first step in such an algorithm in examining two pixels of different color is to first determine which is the lighter. That portion of the lighter image is then expanded. Although this approach preferably uses an extensive lookup table, it is not complicated and is within the skill of the art. The pixel-by-pixel algorithm for overlapping images mentioned earlier for the case of the darker first image can be used if the second image is darker.

Note that the embodiment in FIG. 5 has the advantage of reducing scavenging of the first image by holding the first image to the image member with greater force during the second toning step. However, it requires excellent registration of the second exposure to prevent a second color border on portions of the first image that are not intended to be adjacent the second image. The embodiment shown in FIG. 4, on the other hand, has the advantage of curing registration problems where the two images interface but does not add to the registration problems where the images are not adjoining.

As illustrated in FIGS. 3, 4 and 5, to expose through the base, the support 3 must be transparent to the exposing radiation. A conductive layer 9 generally positioned between the support 3 and the photoconductive layer or layers 5 must also be transparent. Both transparent supports and transparent conductive layers are well known in the art. Transparency is generally obtained in a conductive layer by use of a normally nontransparent material but by making the layer extremely thin. Thin layers of nickel, tin, cuprous iodide and other conductive materials are usable for this application.

Figure 1:
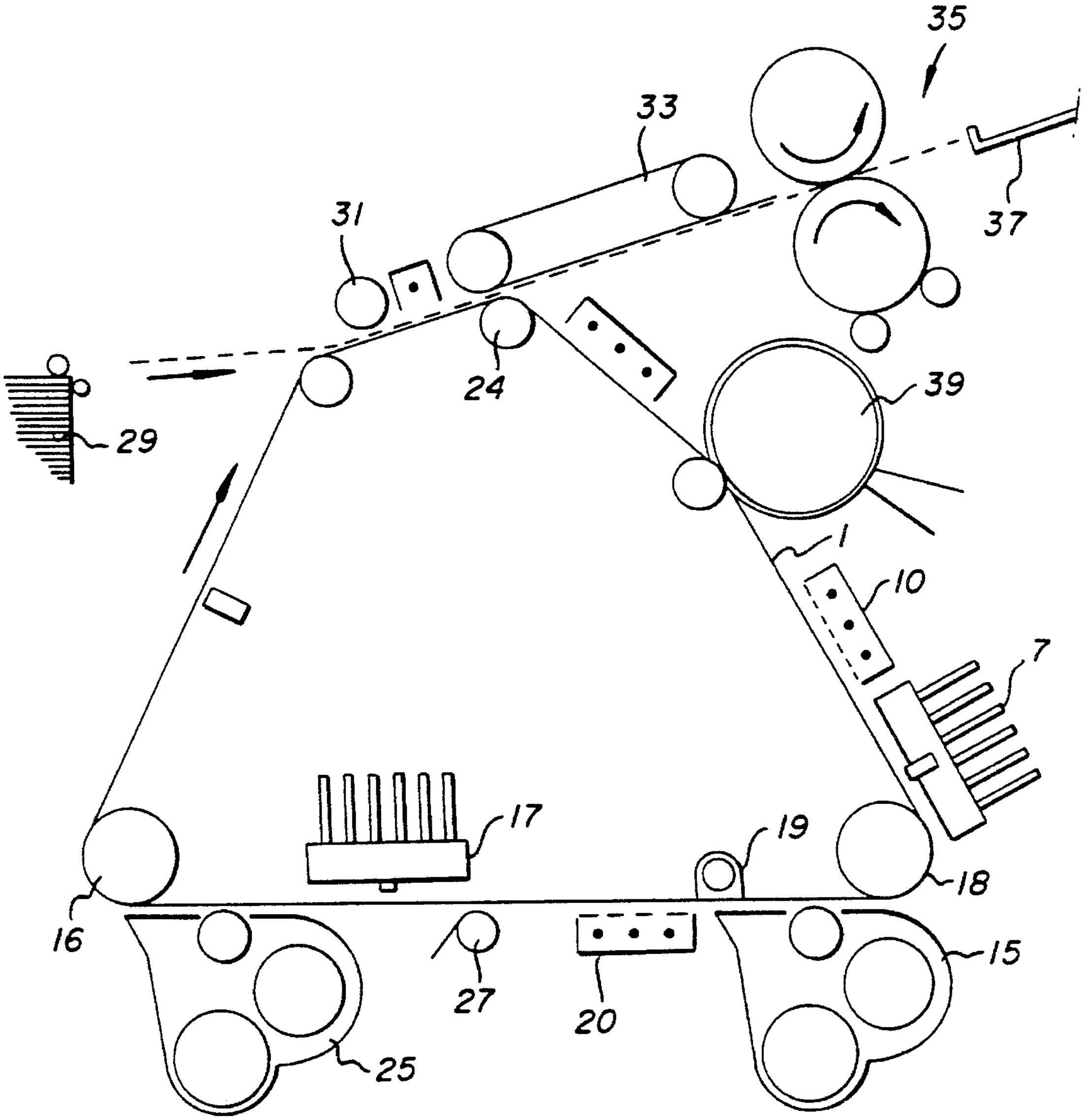
FIG. 1 is a side schematic of an image forming apparatus.

The charge underneath the first toner can also be dissipated by front exposure providing the material making up the first toner image is chosen to be transparent to the activating radiation of the second exposure. This is a known procedure for providing overlapping toner images. For example, an infrared laser is used for the activating radiation with an appropriately sensitized photoconductive material in the photoconductive layer 5. The toner is then chosen from materials that are opaque to visible light and provide the appropriate color but which are transparent to the activating radiation. Exposure from the front, while feasible, is especially less desirable than exposure through the support in an accent color application, because it restricts the design of the toners and the color order in which they are laid down. Further, exposure through the support, as shown in FIG. 1, can also be used when it is desirable to overlap toner images, for example, in process color applications when the toners of the earlier images partially block subsequent exposures.

Another solution to the problem of toner movement that can be used instead of, or in combination with, the first solution is illustrated in FIGS. 2*a*–2*f*. This approach is the subject of U.S. patent application Ser. No. 08/064,621, filed even date herewith in the names of Stelter and Alexandrovich. A number of studies have been done on the problems associated with transferring very small toner particles from one surface to another. These studies found that the smaller the toner particle, the more difficult it is to move the toner particle electrostatically. This is because Van Der Waals and other surface forces that are not traditionally electrostatic in nature, are greater with respect to a small toner particle compared to the electrostatic forces that are capable of being imparted to the small toner particle. As a result, very small toner particles have commonly been transferred by heat rather than by electrostatics.

Some of this principle applies to the problem of moving toner particles in the method illustrated in FIGS. 2*a*–2*f*. The tendency of the toner to move into adjacent areas exposed in the second exposure is greatly lessened the smaller the toner particle. If the system ultimately plans transfer of the multicolor toner image using an electrical field, much reduction of the toner particle size can be counterproductive. However, there are substantial reductions in the movement of toner particles described with respect to FIG. 3 if the particle size is reduced to less than 10 microns mean particle diameter. At the same time, particles larger than 6 microns are still transferable electrostatically to an appropriate receiving sheet. Office copiers and printers commonly use toners of 12 microns or more in diameter.

Figure 6:
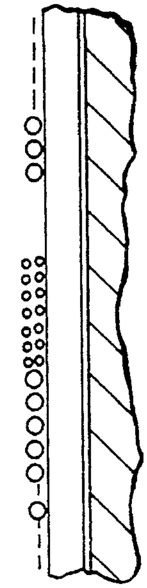

For example, referring to FIGS. 4–6, the first toner image is formed of small size, dark toner particles, for example, black toner particles having a mean particle diameter of 8 microns. Exposure is through the base with desired overlapping, as shown in either FIG. 4 or FIG. 5, to create a second electrostatic image but without movement of the first toner image. According to FIG. 6, the second electrostatic image is toned with larger, light color toner particles, for example, yellow, light blue, orange or pink toner particles having a 12 micron mean diameter which behave well using projection toning to provide a second toner image which may overlap the first toner image. (The relative sizes of the toner particles in the FIGS. has been exaggerated, as have the thicknesses of the layers for illustration purposes. Relative densities of the toner images are dependent on the charge-to-mass ratio of the toner particles themselves as well as other parameters of the system.)

Figure 7:
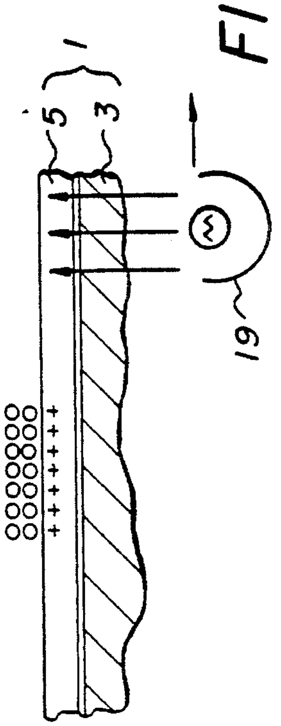

FIG. 7 illustrates another feature that reduces the tendency toward toner blowoff as well as scavenging. After the first toning step, for example, as shown in FIG. 2*c*, creating the first toner image but before the second charging step illustrated in FIG. 2*d*, the image member is blanket exposed with radiation to which the image member is sensitive through its transparent support 3 to as much as possible eliminate negative charge from the first electrostatic image on the image member. The toner is then held on the image member by surface forces and compensating positive charge (electron holes) that move through the photoconductive layer attracted by the negative charge still remaining on the toner itself. Although it might be expected that this step would be somewhat overwhelmed by the charge in the second charging step, it still reduces the tendency of the toner to blowoff in the second exposure step. This is apparently due to the holes remaining near the surface of the photoconductive layer, despite the second charging step. With the overlapping second exposure (FIGS. 4 and 5), more holes are attracted toward the surface to further help hold toner or keep it from moving.

FIG. 1 shows an apparatus for producing two color images in which the second exposure is through the base. According to FIG. 1, an image member 1 is in the form of an endless belt trained about a series of rollers, including a tension roller 16 and a drive roller 18, to continuously move through a series of electrophotographic stations well known in the art. Image member 1 is charged by a charging device 10 to uniform potential, for example, a negative potential. It is imagewise exposed by an exposure device, for example, LED printhead 7 to create a first electrostatic image. The first electrostatic image is toned at a first toning station 15 by the application of toner having a polarity the same as the original charging station 10, for example, a negative polarity and having a small particle size, for example, 8 microns. Toner is, thus, applied to the areas discharged by exposure station 7.

The image member is recharged by an additional charging station 20 which evens up the charge of the first polarity on the image member at a predetermined level. This level need not be the same as the charge applied by station 10. However, before recharging, the image member is exposed to overall blanket radiation through its support by erase lamp 19. As described above, this causes the toner to be more firmly held to the image member, despite charge from the charging station 20. A magnetic scavenger 27 is positioned to attract any carrier inadvertently picked up by the image member in the first toning step. The position of scavenger 27 before toning station 25 is important if the carrier used in station 15 is darker than that used in station 25, so that station 25 is not contaminated with it.

The image member 1 is then imagewise exposed by a second exposure station, for example, a second LED printhead 17 which is positioned inside image member 1 and exposes image member 1 through its transparent support to create a second electrostatic image. The second electrostatic image is toned by a second toning station 25 which applies toner preferably of a color different than that applied by station 15 to create a second toner image on the image member, preferably with toner of a larger particle size, for example, 12 microns, thereby forming a two color or multicolor image on the image member.

A receiving sheet is fed from a receiving sheet supply 29 into overlying contact with the two color toner image. The two color toner image is transferred to the receiving sheet at a conventional biased roller electrostatic transfer station 31 and the receiving sheet separates from the image member as the image member goes around a small roller 24. The receiving sheet is transported by a vacuum transport 33 to a fuser 35 where the two color image is fixed to the receiving sheet. The receiving sheet is ultimately deposited in an output tray 37. The image member is cleaned by cleaning device 39 so that the process can be continued.

This apparatus doubles the speed of doing two color images, compared to conventional approaches in which the images are formed on separate frames and transferred in registration. It also avoids the complexity of registering two image transfers with the attendant complex receiver handling.

Toning stations 15 and 25 are preferably constructed as in U.S. Pat. No. 5,001,028, Mosehauer issued Mar. 19, 1991, which patent is hereby incorporated by reference herein. For highest quality, the first toning station 15 is spaced from the image member 1 by an amount less than the nap of the magnetic brush. The brush, thus, directly contacts the image member, providing a high quality dense image. The second toning station 25 is spaced from image member 1 by enough that the nap does not directly contact image member 1. An AC component on the bias on station 25 helps provide the density desired in the second image despite the gap between the nap and the image member.

FIGS. 8–15 show the details of a linear printhead writer assembly 50 suitable for use as either printhead 7 or printhead 17 in FIG. 1. However, its construction makes it particularly adaptable to backside location and is, therefore, particularly usable as printhead 17 in FIG. 1.

Figure 8:
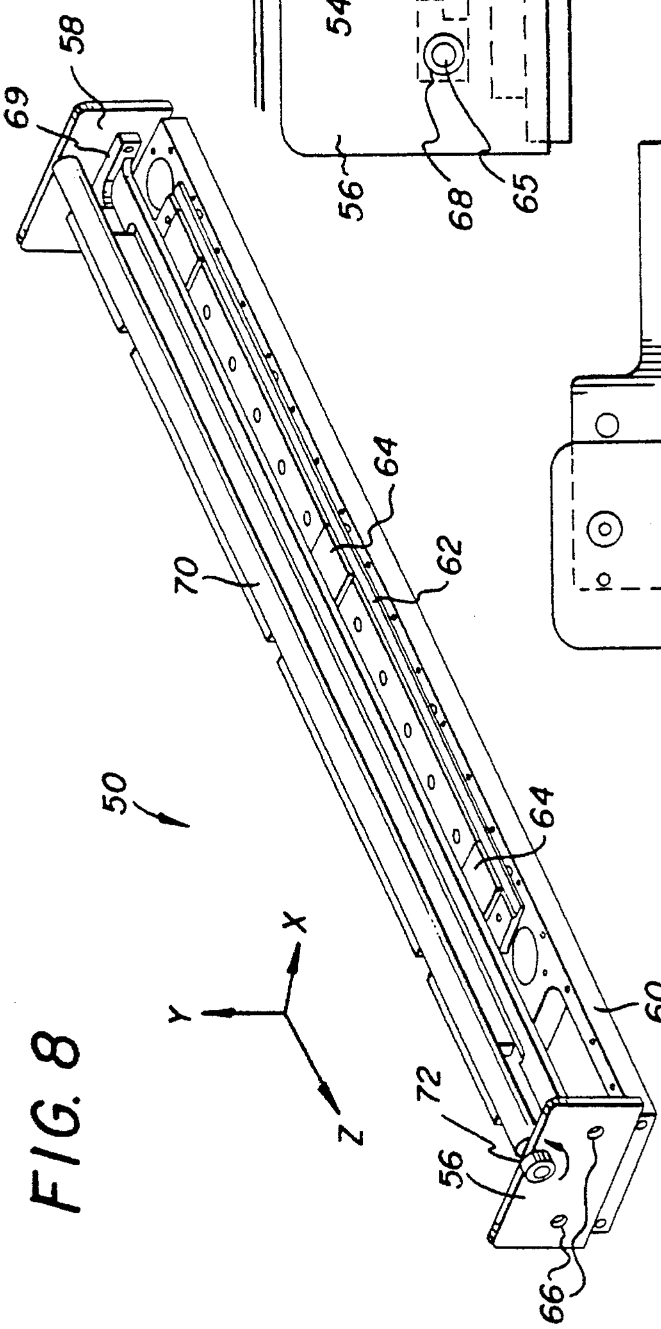
FIGS. 8, 12, 13 and 14 are perspective views of portions of an LED printhead writer assembly.
Figure 9:
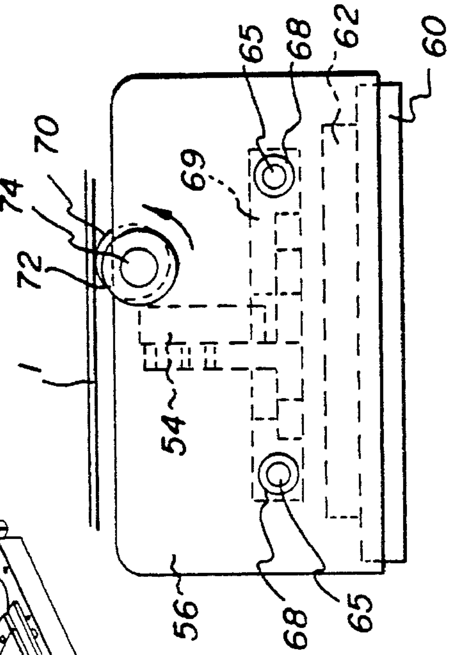
FIGS. 9–11 and 15 are side views of an LED printhead writer assembly with FIG. 10 showing an alternative embodiment to FIGS. 9 and 15.
Figure 13:
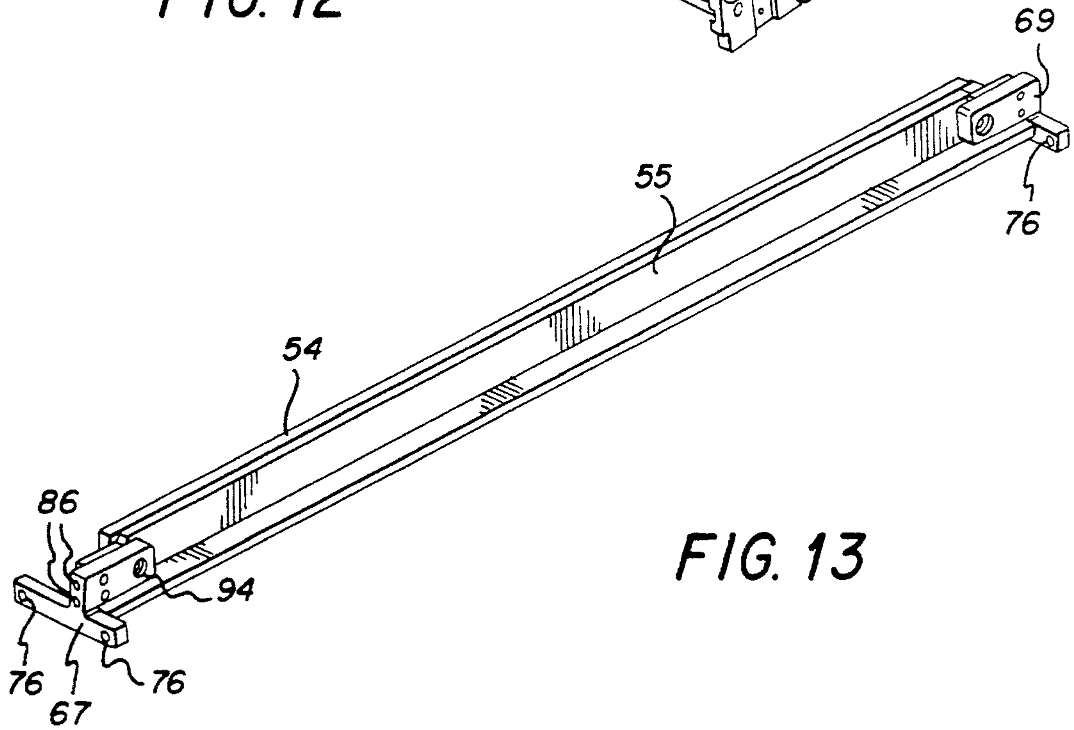

Referring especially to FIGS. 8, 9 and 13, linear printhead writer assembly 50 includes a linear source of radiation, for example, a linear LED array 52 (FIGS. 9 and 15), a linear focusing means, for example, a linear lens 54 such as a conventional Selfoc® (trademark of Hitachi, Ltd.) lens and a suitable support housing. The LED array is supported on support tiles 64 (FIG. 8) which, in turn, are supported on a mother board 62 which, in turn, is supported on a baseplate 60. The baseplate 60 is fixed with respect to a pair of support or datum plates 56 and 58 which are positioned at each of the baseplate ends.

As shown in FIG. 13, the lens 54 is fixed to a lens support 55 to which is affixed a pair of end supports 67 and 69 using a thermal compensating means which will be described below.

End supports 67 and 69 each contain screw holes 76 which are positioned in alignment with oversized holes 66 in support plates 56 and 58 (FIG. 8). Screws 65, each with an oversized washer 68 (FIGS. 9 and 15) are inserted through holes 66 and into screw holes 76. The screws 65 can be moved within holes 66 to position lens 54 with respect to LED array 52 for final factory adjustment of those two components.

According to FIGS. 8 and 9 a single positioning bar 70 is mounted between support plates 56 and 58. The LED array 52, the lens 54 and the positioning bar 70 are all elongated parallel to a Z axis. (Orthogonal X, Y and Z axes are shown in FIG. 8.) The upper surface of positioning bar 70 contacts image member 1, as shown in FIGS. 9 and 15, to control the distance (in a Y direction) between image member 1 and lens 54 and LED array 52.

Both factory and field adjustment of positioning bar 70 is accomplished by mounting positioning bar 70 eccentrically on a shaft 74. Shaft 74 is mounted on support plates 56 and 58. A knob 72 is used to rotate shaft 74 to rotate bar 70. Because of the eccentric mounting of bar 70 with respect to shaft 74, the top surface of bar 70 moves toward and away from LED array 52 as bar 70 is rotated.

Figure 15:
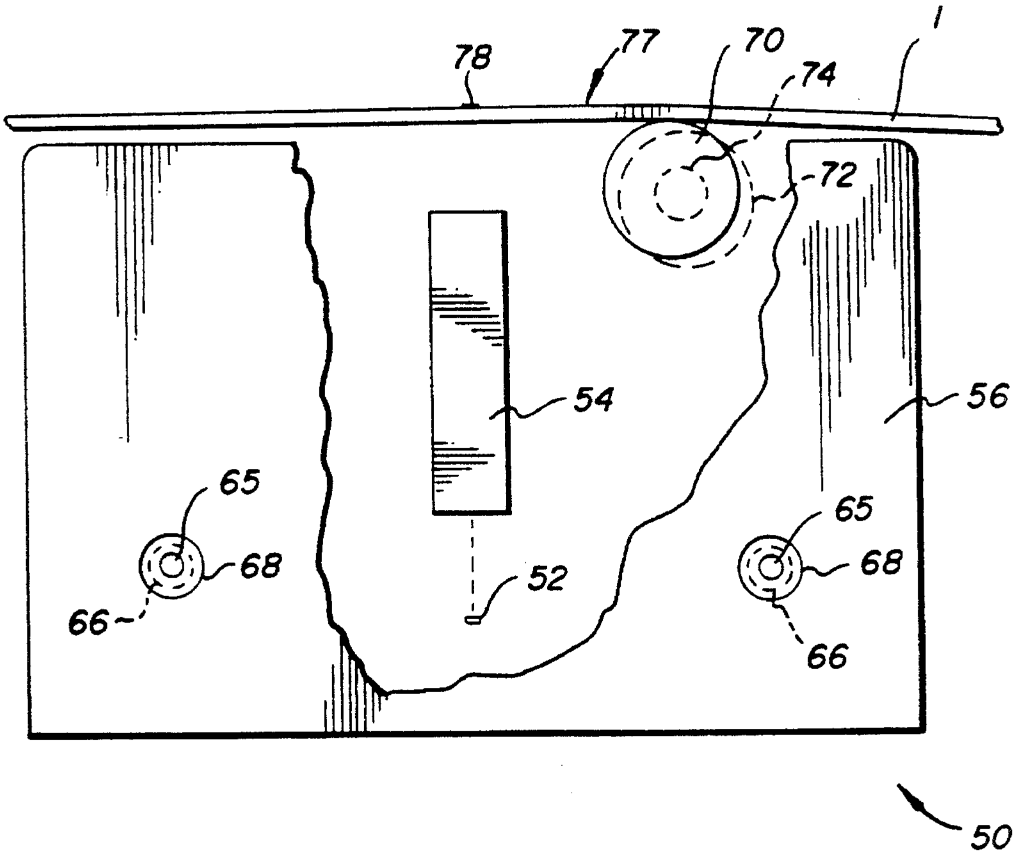

Focusing of lens 54 with respect to both conjugates is best shown by reference to FIG. 15, in which unnecessary details are eliminated. In the factory, writer assembly 50 is mounted in a suitable fixture for adjusting focus (see, for example, U.S. Pat. No. 4,928,139, which patent is hereby incorporated by reference herein). Lens 54 is moved in the fixture until LED array 52 is imaged, by lens 54, at a desired linear exposure locus 78, which locus is also parallel to the Z axis. This movement is accomplished by movement of screws 65 within oversized holes 66 in plates 56 and 58. When the proper focus is obtained, the screws 65 are tightened to fix lens 54 with respect to LED array 52 and plates 56 and 58. Factory adjustment of positioning bar 70 can be accomplished at the same time by rotating knob 72 to rotate positioning bar 70 around eccentric shaft 74. A length of web, for example, a web having the same thickness as the proposed image member 1, can be tensioned across bar 70 to help in determining whether the appropriate side of the web is positioned in exposure locus 78 as the knob 72 is rotated. Determination of focus can also be done with appropriate instrumentation, known in the art.

When the assembly 50 is inserted in the image forming apparatus shown in FIG. 1, assembly 50 is fixed to the mechanism plates of the apparatus. As shown in FIG. 15, assembly 50 is positioned so that the positioning bar 70 intersects the path of image member 1 and, thus, lightly pushes the image member away from its normal path, for example, its path between rollers 16 and 18 in FIG. 1. If toning stations 15 and 25 have parts which control the position of image member 1, then bar 70 would intersect the path of image member 1 between the developing stations. Thus, the positioning bar 70 partially defines the path of image member 1.

During setup, copies or prints are run and the resolution of the image measured or observed. At this point, knob 72 can be rotated to move image member 1 toward or away from lens 54. This movement, using the backside location shown, would move the first side 77 of image member 1 having the radiation-sensitive layer associated with it into the exposure locus 78. The exposure locus 78, of course, is fixed with the fixing of assembly 50 in the apparatus. Positioning bar 70 has the function of moving the lateral position of image member 1 to assure proper location of the sensitive part of image member 1 with respect to the exposure locus 78. Note that this positioning structure is not dependent upon the use of springs to urge the printhead assembly against backing members or the image member itself. The printhead assembly is fixed with respect to the mechanism plates of the apparatus. Extremely accurate positioning of the printhead in the apparatus is also not critical providing bar 70 intersects the path of image member 1.

Positioning bar 70 is shown in the FIGS. as adjustable as a unit from one end by rotation as described. Alternatively, eccentric mounts at each end can be provided which would allow field adjustment of each end of bar 70 with respect to the exposure locus. This is ordinarily not necessary, since skew adjustment of lens 54 in the factory (using screws 65) assures a parallel relation between the exposure locus 78 and bar 70.

Figure 10:
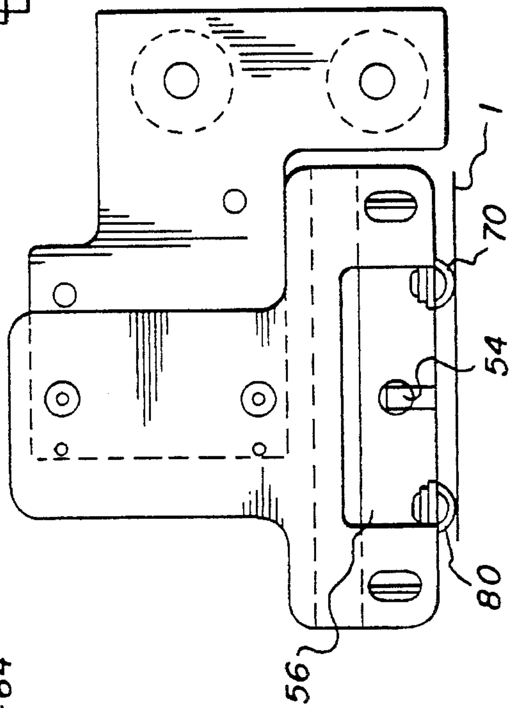

FIG. 10 illustrates an alternative embodiment in which two positioning bars 70 and 80 are positioned on opposite sides of lens 54 and both contact image member 1. This structure is very similar to the embodiment shown in FIGS. 8, 9 and 15. It has the advantage of precisely determining the location of image member 1 without regard to orientation of the assembly 50 in the apparatus. The embodiments shown in FIGS. 8, 9 and 15, however, have the advantage of simplicity and also have no danger of being overconstrained, a condition that can occur with two positioning bars. Note that either of the positioning bars can be adjustable, or both can be adjustable, depending upon the amount of adjustment desired.

Note also that image member 1, when in contact with positioning bar 70, will have a slight break to it because the direct mounting for assembly 50 assumes intersection by positioning bar 70 with the path of image member 1 so that the path of image member 1 can be controlled by positioning bar 70.

Positioning bar 70 is shown as being rotatable only to adjust its spacing from lens 54. However, it could also be a roller rotatable with the image member 1. This has the advantage of reducing fiction between the bar 70 and the image member 1, but it makes the eccentric mount of the bar somewhat more complicated.

FIGS. 11–14 illustrate a thermal compensation device for lens 54. As described above, lens 54 is fixed to lens support 55 which, in turn, is secured to end supports 67 and 69. As the LED array is used, it gradually heats up the lens and the lens support. The lens and lens support can be made of similar materials and expand together. However, the housing, for example, baseplate 60, does not necessarily expand at the same rate. Thus, it is conventional to provide a thermal compensation coupling between the housing and the lens support.

Figure 11:
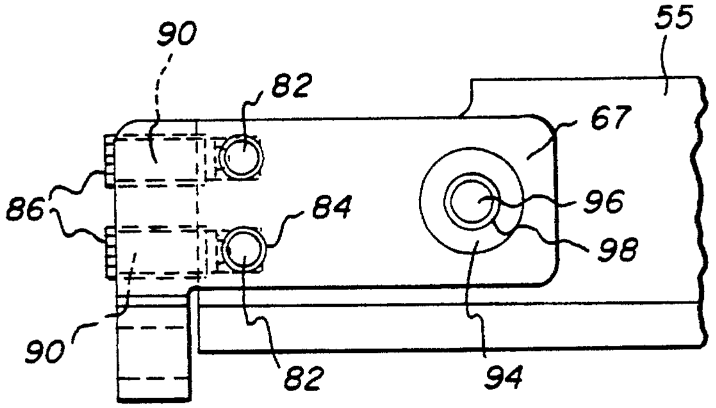
Figure 12:
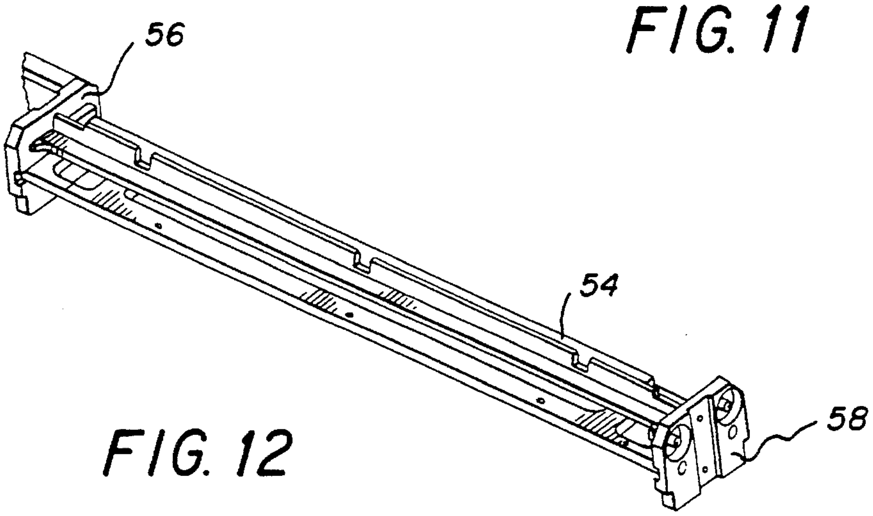
Figure 14:
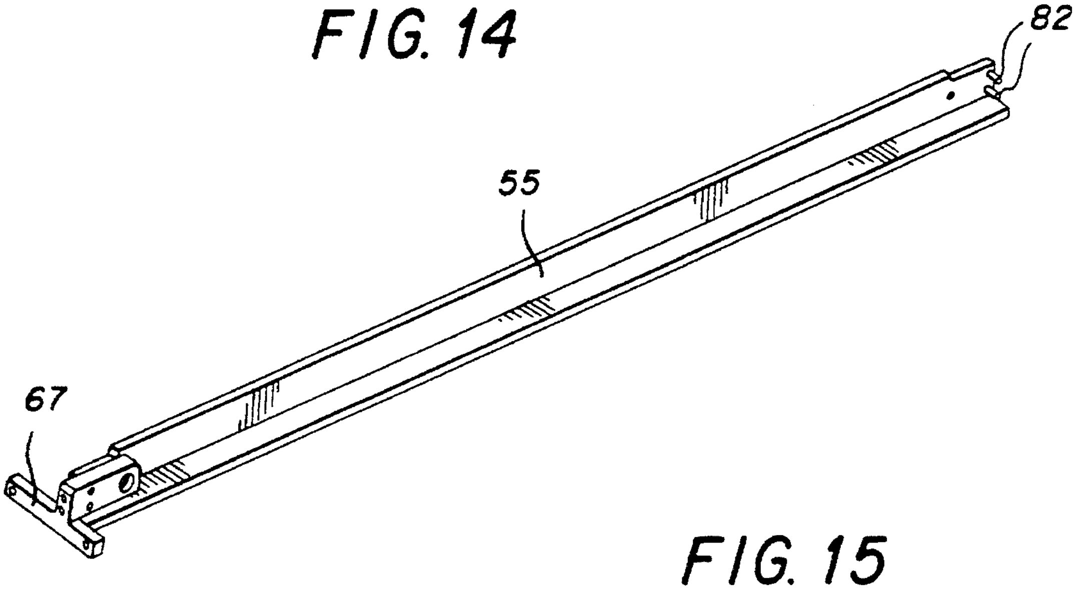

As shown in FIG. 14, lens support 55 has a pair of pins 82 at each end. The pins have an axis oriented in the X direction (FIG. 8) and generally transverse to the longitudinal orientation of the lens support 55 (Z direction). The pins are inserted in oversized holes 84 in end supports 67 and 69, as best seen in FIG. 11. Thermal expansion in the Z direction would cause a buckling of lens support 55 if not compensated for. Such thermal expansion is permitted by the looseness of fit between pins 82 and oversized holes 84. Actual location of pins 82 within oversized holes 84 is controlled by suitable a dampener 90, for example, a spring or elastomer, which is positioned to resiliently resist movement of pins 82 in the Z direction away from the center of the lens support 55. The dampeners 90 are held in end supports 67 and 69 by spring loaded shoulder screws 86. Preferably, they are rubber shock absorbers which can be loosened or tightened by screws 86 to vary their force on pins 82.

This approach to thermal compensation has the distinct advantage over prior approaches of also dampening vibration in the Z direction. The vibration to lens 54 will cause slight movements of the image. The extent to which such movements cause noticeable defects in the final image depends on the extent of the vibration. Prior thermal compensating devices that secured the lens support at one end have no dampening effect on such vibrations. However, the approach shown in FIGS. 11–14, in addition to allowing for thermal expansion, dampens vibrations. Notice that both ends of the lens support are isolated from the housing by the dampening structure 86. Further, the dampening structure itself absorbs much of any vibration without it getting to the lens support 55. If one end of the lens support were fixed and the other one allowed to move, as in conventional thermal expansion approaches, the vibration would be transmitted completely to the lens support through the fixed end. In this instance, by providing resilient dampening structures as well providing them at both ends, vibrations from other parts of the machine that are transmitted to the housing are, at least to some extent, not passed on to the lens. Further, using the preferred rubber shock absorbers for dampeners 90, an adjustment can be made to the dampening force which allows it to be tuned to dampen particular frequencies that are more troublesome in the particular unit.

Lens support 55 is secured to each of end supports 67 and 69 using a shoulder screw, not shown, secured in a hole 96 in lens support 55 through an oversized hole 98 in the end support. The shoulder screw is tightened against a spring that fits between it and a shoulder of the end support.

The invention has been described in detail with particular reference to a preferred embodiment thereof, but it will be understood that variations and modifications can be effected within the spirit and scope of the invention as described hereinabove and as defined in the appended claims.

We claim:

1. A linear printhead writer assembly for use with a web type image member having a width and at least one radiation-sensitive layer and movable through a path in an in-track direction, said writer assembly comprising:

an elongated linear source of radiation, an elongated linear focusing device for focusing radiation from said linear source of radiation at an elongated exposure locus, a support housing for supporting both said source of radiation and said focusing device in a fixed relation to each other and to the exposure locus with said source of radiation, said focusing device and said exposure locus being oriented in a cross-track direction with respect to the path of the image member by the support housing, at least one positioning bar having a length in the cross-track direction at least as long as the width of the image member and supported by the housing and accurately positioned with respect to the exposure locus, and means for fixing the assembly in an image forming apparatus with the positioning bar intersecting the path of the image member to partially support the image member and partially define the path of the image member with the radiation-sensitive layer in the exposure locus.

2. Image forming apparatus comprising:

an endless belt image member including first and second opposite sides, a transparent support and a radiation-sensitive photoconductive layer associated with the first side, a series of rollers positioned to engage the second side of the image member and at least partially define its movement through an endless path, means for forming a first toner image on the first side of the image member with a first toner having a charge of a first polarity, means for uniformly charging the first side of the image member and the first toner image with a charge of the first polarity, a printhead writer assembly constructed according to claim 1 and positioned with the positioning bar engaging the second side of the image member to partially define the endless path of the image member, said writer assembly being operable to imagewise expose the image member through the second side of the image member and through the transparent support of the image member to create an electrostatic image on the first side of the image member, and means for toning the electrostatic image to create a second toner image on the image member.

3. Image forming apparatus according to claim 2 wherein the linear source of radiation is a linear array of LED's.

4. Image forming apparatus according to claim 2 wherein the positioning bar is adjustable with respect to the support housing and the focusing device.

5. Image forming apparatus comprising:

a plurality of rollers for supporting a web type image member, having a cross-track width, for movement through a path in an in-track direction, an elongated linear source of radiation, an elongated linear focusing device for focusing radiation from said linear source of radiation at an elongated exposure locus, a support housing for supporting both said source of radiation and focusing device in a fixed relation to each other and to the exposure locus with said source of radiation, said focusing device and said exposure locus being oriented in a cross-track direction with respect to the image member by the support housing, and at least one positioning bar having a length in the cross-track direction at least as long as the width of the image member and supported by the housing and accurately positioned with respect to the exposure locus to engage the imaging member to partially displace the imaging member from its path and control the position of the imaging member with respect to the exposure locus.

6. An image forming apparatus according to claim 5 wherein the positioning bar is adjustable with respect to the support housing and the focusing device to adjust the distance between an engaged image member and the focusing device.

7. An image forming apparatus according to claim 6 wherein the positioning bar is eccentrically mounted with respect to the support housing and is rotatable around the eccentric mounting to vary the distance between an engaged image member and the focusing device.

8. An image forming apparatus according to claim 6 wherein each end of the positioning bar is separately adjustable with respect to the support housing.

9. An image forming apparatus according to claim 5 including a lens support to which said focusing device is fixed and an end support positioned at each end of the lens support, and coupling means coupling the lens support and the end supports which allows thermal expansion of said lens support in the Z direction with respect to each of said end supports.

10. An image forming apparatus according to claim 9 wherein said coupling includes dampening means having a resilient force opposing thermal expansion of said lens support at each end of said lens support which dampening means also tends to isolate the lens support with respect to vibrations transmitted through said end supports.

11. An image forming apparatus according to claim 5 including a second positioning bar, the two positioning bars being located on opposite sides of the exposure locus for engaging the image member and for positioning the image member with respect to the focusing device.

12. An image forming apparatus according to claim 5 wherein the linear source of radiation is a linear array of LED's.

13. Image forming apparatus usable with an endless belt image member having a width, said apparatus comprising:

a plurality of rollers for supporting the image member for movement through an endless path which image member has a radiation-sensitive layer associated with a first side of the image member and which first side is opposite a second side of the image member which second side engages the plurality of rollers, and a linear printhead writer assembly positioned on the second side of the image member which assembly is constructed according to claim 1.

14. Image forming apparatus according to claim 13 wherein the linear source of radiation is a linear array of LED's.

15. Image forming apparatus according to claim 14 wherein the positioning bar is adjustable with respect to the support housing and the focusing device.

16. Image forming apparatus according to claim 13 including a second positioning bar, the two positioning bars being located on opposite sides of the exposure locus.

* * * * *